United States Patent
Carollo

Patent Number: 6,144,439
Date of Patent: Nov. 7, 2000

[54] METHOD AND APPARATUS FOR REDUCING GHOST IMAGES WITH A TILTED CHOLESTERIC LIQUID CRYSTAL PANEL

[75] Inventor: Jerome T. Carollo, Carlsbad, Calif.

[73] Assignee: Kaiser Electro-Optics, Inc., Carlsbad, Calif.

[21] Appl. No.: 08/902,426

[22] Filed: Jul. 29, 1997

[51] Int. Cl.[7] ............................. G02F 1/13; G02F 1/1335
[52] U.S. Cl. ............................. 349/176; 349/175; 349/57; 345/7; 359/235; 359/635
[58] Field of Search .................................... 349/176, 175, 349/57; 359/630, 635, 235; 345/7

[56] References Cited

U.S. PATENT DOCUMENTS

| | | | |
|---|---|---|---|
| 3,915,548 | 10/1975 | Opittek et al. | 345/7 |
| 4,093,347 | 6/1978 | La Russa | 359/630 |
| 5,050,966 | 9/1991 | Berman | 349/194 |
| 5,671,091 | 9/1997 | Monroe et al. | 359/635 |
| 6,038,054 | 3/2000 | Sakai et al. | 359/253 |

Primary Examiner—William L. Sikes
Assistant Examiner—Julie Ngo
Attorney, Agent, or Firm—Townsend and Townsend and Crew LLP

[57] ABSTRACT

A collimating apparatus that reduces ghost images in the field of view of a main image generated. The collimating apparatus includes a meniscus lens having a reflective concave surface; a cholesteric liquid crystal (CLC), aligned on an axis common with the meniscus lens, disposed on the concave side of the meniscus lens, positioned to reflect light onto the concave surface and having a tilt making the normal of the CLC different from the normal of the meniscus lens; and an image source, disposed on the convex side of the meniscus lens and having a tilt corresponding to the tilt of the CLC. The tilted pair of the meniscus and image source direct any ghost images produced by light leaking through the CLC away from the line of sight of an observer of the main image.

10 Claims, 5 Drawing Sheets

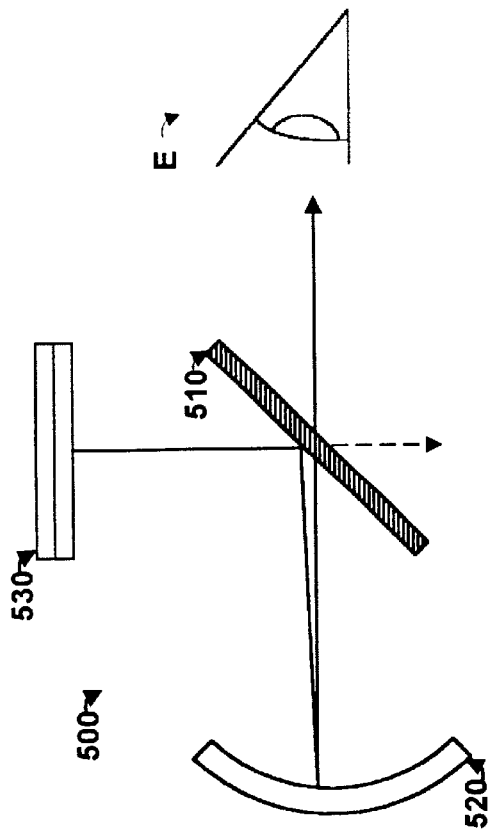
Figure 5B *(Prior Art)*
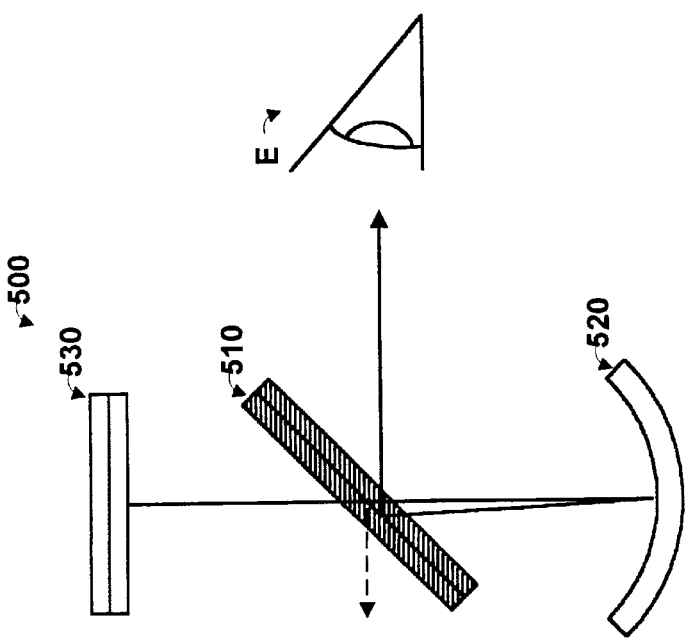
Figure 5A *(Prior Art)*

METHOD AND APPARATUS FOR REDUCING GHOST IMAGES WITH A TILTED CHOLESTERIC LIQUID CRYSTAL PANEL

BACKGROUND OF THE INVENTION

This invention relates to apparatus for forming images for heads-up displays and, more particularly, to apparatus for collimating a projected image at or near infinity.

Helmet mounted displays (HMD's) having many different types of optical collimating systems are known in the art. These optical systems generate an image appearing to be located very far from the observer from a small image source magnified by its placement very near to the observer's eye.

Berman & Melzer, U.S. Pat. No. 4,859,031 (1989), teaches a vision immersion modules® (VIM®) type of optical collimating system. FIG. 1 illustrates a Berman & Melzer apparatus. In FIG. 1, the apparatus 100 includes an image source 110, a lens 120 and a cholesteric liquid crystal (CLC) 130. An observer viewing the image produced by the apparatus 100 is represented by an eye E. (FIG. 1 is not drawn to scale.)

The lens 120 is a meniscus, coated on its concave side to reflect light. The lens 120 is, therefore, a partially reflective meniscus.

Berman & Melzer utilizes unique properties of cholesteric material. A CLC device will reflect those components of light that are within a particular bandwidth B, and of a particular rotary sense of circular polarization. Light reflected by a CLC will keep its original rotary sense. Thus, for example, light projected upon a CLC device constructed to reflect light components within a bandwidth $B_1$ and having a right hand circular polarization (RHCP) will pass all other components of that light, including light components within the bandwidth $B_1$ and having a left hand circular polarization (LHCP). The reflected light maintains its original polarization (RHCP).

The image source 110, lens 120 and CLC 130 are aligned orthgonally to and optically along an axis A to operate as described below. LHCP light from the image plane 110 partially passes through the meniscus lens 120 and strikes the CLC 130. The CLC reflects the LHCP light back to the meniscus lens 120, without changing its polarization handedness. The reflectively coated side of the lens 120 in turn reflects the LHCP light back to the CLC 130, changing the polarization of the light to RHCP. The RHCP light can now pass unobstructed through the CLC and out to the eye E.

Although the Berman & Melzer apparatus 100 is both compact and lightweight, the efficiency of the CLC 130 of the VIM® optical collimating assembly 100 is not 100%. Some light within the bandwidth $B_1$ and having the correct polarization handedness nonetheless leaks through the CLC 130 instead of being reflected back towards the meniscus lens 120. This light passes directly to the eye and forms an unwanted image called a "ghost image". With the VIM® optical assembly of FIG. 1, the ghost image lies directly in the center of the desired image.

Berman, U.S. Pat. No. 5,050,966 (1991), teaches an optical collimating apparatus. FIG. 4 illustrates a Berman combiner apparatus 400, in which a combiner element 410 transmits all components of light from image sources 420 (through a collimating optic 430) and 460 out of the line of sight of an observer E, except for light of the desired polarization handedness and bandwidth. The Berman combiner element 410 reflects this desired light at an angle into the line of sight, through a CLC 440 and semi-reflective mirror 450, toward the observer E.

The combiner 410 of the Berman apparatus, however, increases the complexity and size of the apparatus 400. Further, the combiner 400 forces an angle into the apparatus 400 which further affects the size requirements of any display system incorporating it.

Also, the Berman apparatus 400 assumes that its CLC 440 is 100% efficient. While such an assumption is reasonable for modeling the problem which Berman addresses, in actuality the CLC 440 leaks, with the attendant problems described above. Finally, in those configurations where Berman does not include a combiner 410, there is no angle with which to differentially reflect desirable and undesirable light.

Trissel and DeFoe, U.S. Pat. No. 5,408,346 (1995), teaches an optical collimating apparatus for focusing an image. (Trissel and DeFoe is assigned as well to the assignee of the instant invention.) FIG. 5A illustrates the Trissel and DeFoe apparatus 500, including a CLC 510 and a mirror 520. The CLC 510 reflects light within a predetermined bandwidth and having a predetermined circular polarization while transmitting all other light. The mirror 520 expands (collimates) light received.

In the apparatus 500, the CLC 510 is positioned to transmit image light from an image source 530 to the concave mirror 520, reflecting light having the predetermined frequency and handedness characteristics out of the line of sight of an observer E. The mirror 520 expands (collimates) the image light received from the CLC 510 and reflects the collimated light back to the CLC 510, reversing its handedness. The CLC transmits this light to the line of sight of the observer.

FIG. 5B shows an alternative embodiment of the Trissel and DeFoe apparatus.

Accordingly, there is a need for an optical collimating system that generates an image without producing ghost images in the field of view of the generated image, using as simple a configuration and as few components as possible.

These and other objects of the invention will be readily apparent to one of ordinary skill in that art on the reading of the background above and the description herein.

SUMMARY OF THE INVENTION

Herein is described a collimating apparatus that reduces ghost images in the field of view of a main image generated. The collimating apparatus includes a meniscus lens having a reflective concave surface; a cholesteric liquid crystal (CLC), aligned on an axis common with the meniscus lens, disposed on the concave side of the meniscus lens, positioned to reflect light onto the concave surface and having a tilt making the normal of the CLC different from the normal of the meniscus lens; and an image source, disposed on the convex side of the meniscus lens and having a tilt corresponding to the tilt of the CLC. The tilted pair of the meniscus and image source direct any ghost images produced by light leaking through the CLC away from the line of sight of an observer of the main image.

BRIEF DESCRIPTION OF THE DRAWINGS

FIGS. 5A and 5B illustrate the Trissel and DeFoe apparatus.

DESCRIPTION OF THE PREFERRED EMBODIMENT

Figure 1:
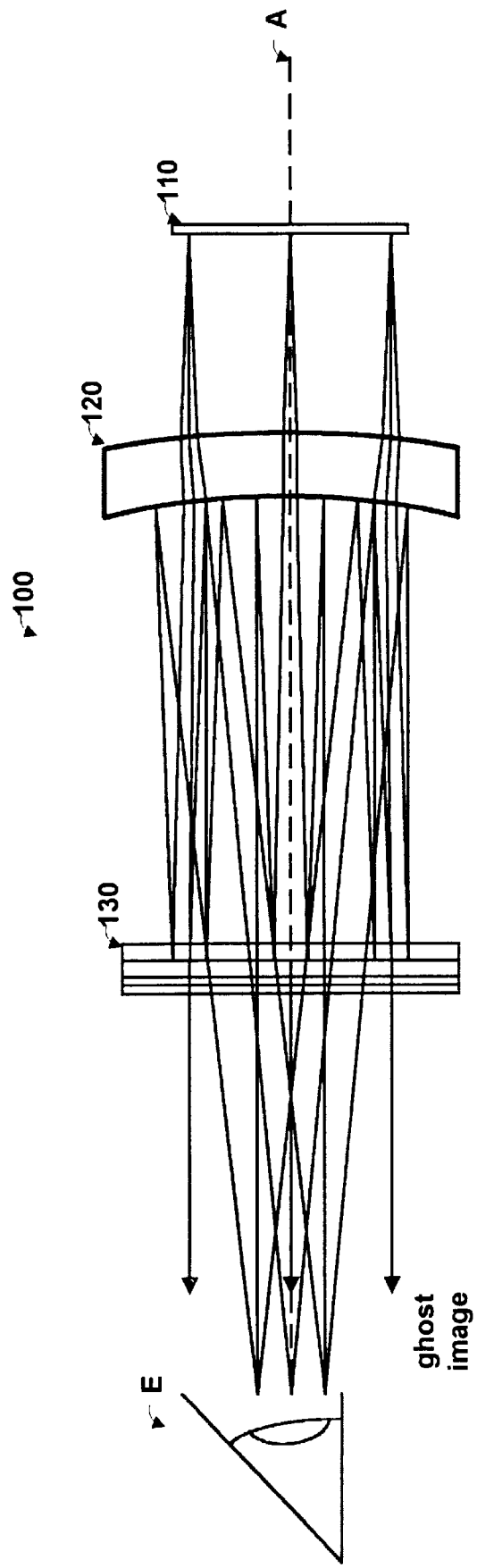
FIG. 1 illustrates a Berman & Melzer apparatus.
Figure 2:
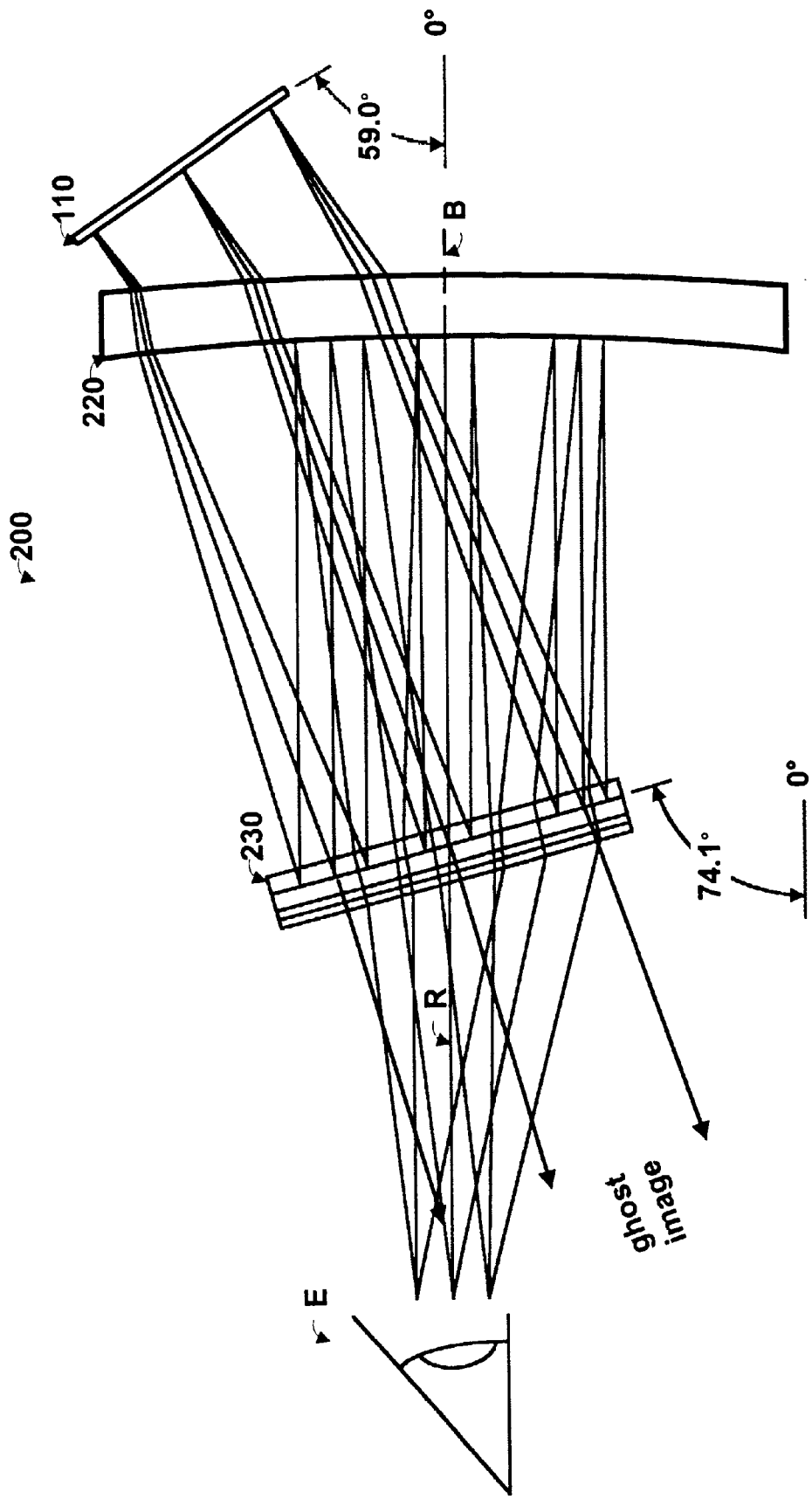
FIG. 2 is a schematic of an optical collimating apparatus according to the invention.

FIG. 2 is a schematic of an optical collimating system 200 according to the invention. In FIG. 2, the apparatus 200 includes an image source 110, a partially reflective meniscus lens 220 and a cholesteric liquid crystal (CLC) 230. The observer of an image generated by the apparatus 200 is represented by an eye E. (FIG. 2 is also not to scale.)

The meniscus lens 220 can have a reflective coating on its concave surface. Alternatively, the partially reflective element 220 can have a holographic optical film on its concave surface.

The image source 110, the meniscus lens 220 and the CLC 230 are arranged as follows. The lens 220 and the CLC 230 are centered along an axis B (coincident with the light ray R) with the concave surface of the lens 220 facing the CLC 230. On the opposite, convex side of the lens 220, the image source 110 is set off from the axis B.

The lens 220 is substantially orthogonal to the axis B, while the CLC 230 is tilted with respect to the axis B. The image source 110 is correspondingly tilted in order to make light from it and eventually passing through the tilted CLC 230 strike the eye E of the observer.

The apparatus 200 operates as follows. Left-handed, circularly polarized (LHCP) light from the image plane 110 passes through the meniscus lens 220 and falls upon the CLC 230. The CLC 230 reflects LHCP light back to the lens 220 without a change to the handedness of its polarization. The reflective aspect of the partially reflective element 220, e.g., the reflective coating or the holographic film, reflects the light back, in the process changing its polarization handedness. The now right-handed, circularly polarized (RHCP) light passes through the CLC 230 and on to the eye E.

In the apparatus 200, the CLC 230 is still not 100% efficient in reflecting LHCP light. Accordingly, some light still leaks through. However, in the apparatus 200, the CLC 230 is tilted with respect to the meniscus lens 220 so that any light leaking through the CLC 230 forms a ghost image out of the line of sight of the observer E. The leaking light is represented in FIG. 2 by arrows.

Given the tilt of the CLC 230, the image source 110 is also tilted in order to keep the entire image plane in proper focus.

The benefit of the arrangement of FIG. 2 is that light from the image source that does get through the CLC 230 is not incident upon the eye E. In this manner, the apparatus 200 avoids the ghost problem of the prior art, and the image quality and the contrast of the display improve significantly.

An additional benefit of the apparatus 200 is that the CLC 230 does not have to operate at angles of incidence greater than 30 degrees, and no special manufacturing techniques are necessary to align the CLC molecules in some non-orthogonal orientation.

A holographic film 220 can replace the partially reflective coating on the curved meniscus lens. The holographic optical film is nearly transparent to light rays with a high angle of incidence (such as those immediately leaving the image source) and very efficiently reflects rays that have an angle of incidence close to normal. Thus, with a holographic film, the overall throughput of the system 200 increases by nearly a factor of four.

Holographic optical film has a relatively narrow bandwidth of operation, and systems employing a single film would be monochromatic displays. However, in one embodiment, several film layers are manufactured on a single substrate so that the apparatus 200 is a full-color display.

Figure 3:
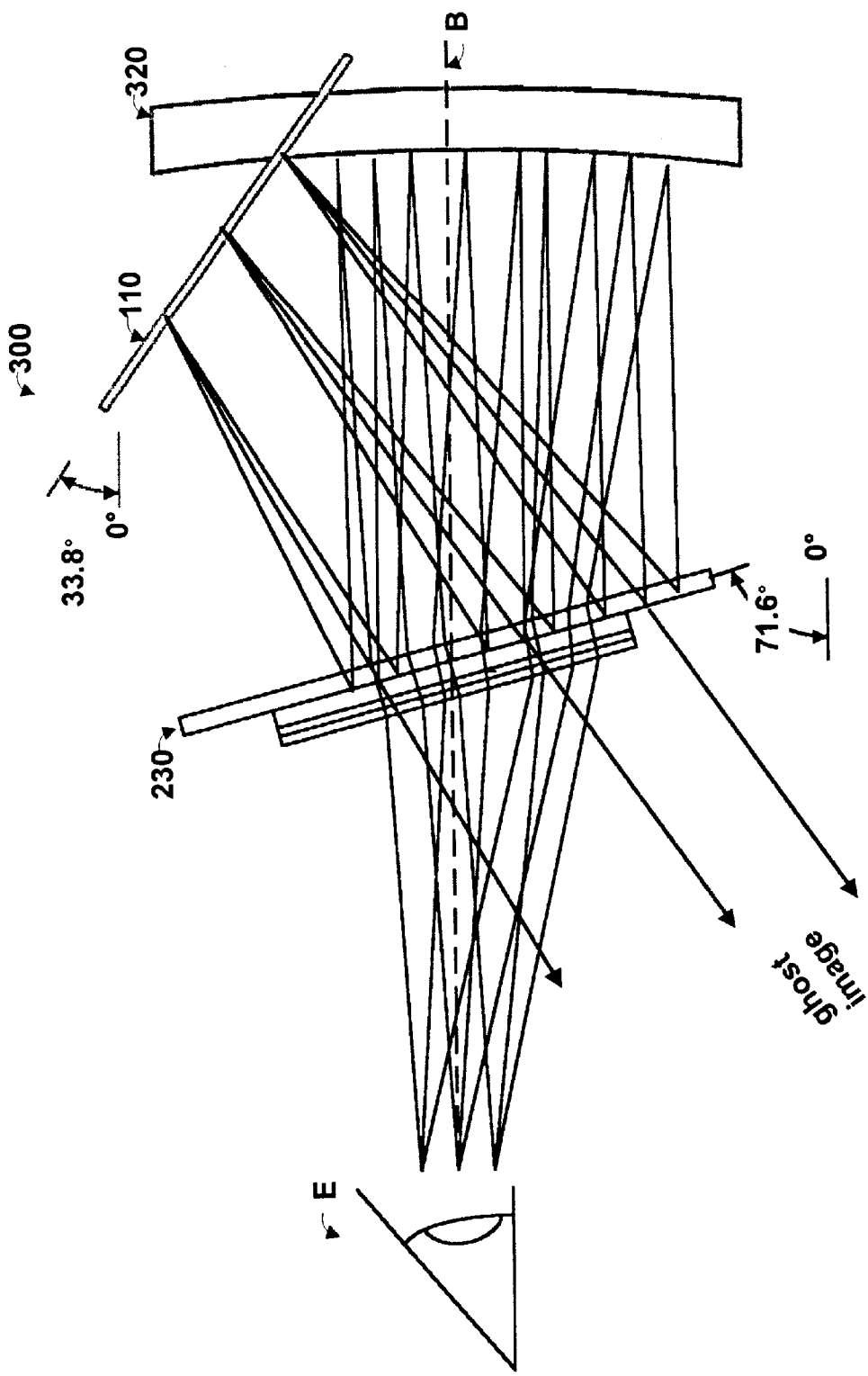
FIG. 3 illustrates another optical apparatus incorporating the invention.
Figure 4:
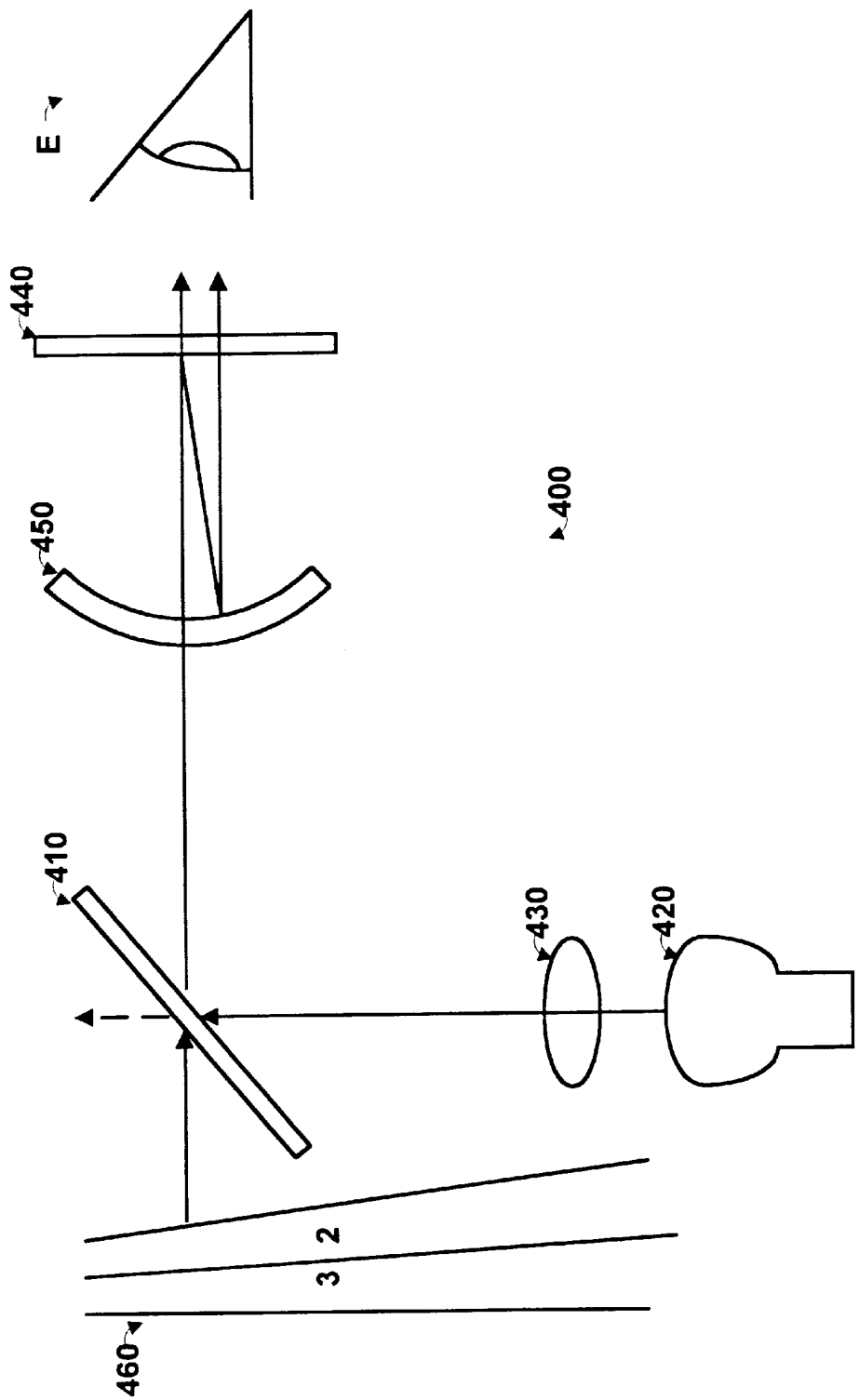
FIG. 4 illustrates a Berman combiner apparatus.

FIG. 3 illustrates another optical apparatus 300 incorporating the invention. The apparatus 300 still includes the image source 110 and CLC 230 described. However, apparatus 300 includes a meniscus lens 320.

The meniscus lens 320 is a fully reflective lens, used as described below.

In FIG. 3 the image source 110, the meniscus lens 220 and the CLC 230 are arranged as follows. The lens 320 and the CLC 230 remain arranged along the axis B, with the concave surface of the lens 320 still facing the CLC 230. The image source 110 is disposed substantially between the lens 320 and the CLC 230, set off from the axis B.

The lens 320 remains substantially orthogonal to the axis B, while the CLC 230 remains tilted with respect to the axis B. The image source 110 is correspondingly tilted in order to make light from it and eventually passing through the tilted CLC 230 strike the eye E of the observer.

The apparatus 300 operates as follows. Light from the image plane 110 falls upon the CLC 230 which reflects the appropriately polarized light to the lens 320 without a change to the handedness of its polarization. The 100% reflective element 320 reflects all of the light back, changing its polarization handedness. The now opposite-handed, circularly polarized (OHCP) light passes through the CLC 230 and on to the eye E.

In the apparatus 300, the imperfectly efficient CLC 230 permits some inappropriately polarized light to leak through. However, as with the apparatus 200, the CLC 230 is tilted with respect to the meniscus lens 320 so that any light leaking through the CLC 230 forms a ghost image out of the line of sight of the observer E. (The leaking light is represented in FIG. 3 by arrows.) The image source 110 is also tilted in order to keep the entire image plane in proper focus.

By moving the image source 110 out from behind the meniscus lens 320 and placing it next to the lens 320 while maintaining its tilted orientation, the coating of the lens 320 can be 100% reflective. The apparatus of FIG. 3 has nearly four times the throughput of the apparatus 200. The excellent ghost reduction properties and standard manufacturing techniques of the apparatus 200 are maintained.

The specific embodiments detailed herein are by way of example and not limitation. Also, modifications and substitutions will be readily apparent to one of ordinary skill in the art on reading the background and invention description above. Accordingly, the scope of the invention is to be determined by the metes and bounds of the claims which follow.

What is claimed is:

1. An optical collimating apparatus comprising:

a meniscus lens having a reflective concave surface; and a cholesteric liquid crystal (CLC), aligned on an axis common with said meniscus lens, disposed on said concave side of said meniscus lens, positioned to reflect light onto said concave surface and having a tilt making the normal of said CLC different from the normal of said meniscus lens; and an image source, disposed on the convex side of said meniscus lens and having a tilt corresponding to said tilt of said CLC.

2. The optical collimating apparatus of claim 1 wherein said image source comprises an image source, disposed on both the convex side and the concave side of said meniscus lens.

3. The optical collimating apparatus of claim 2 wherein said CLC comprises a CLC having a tilt making the normal of said CLC more than zero (0) degrees and less than thirty (30) degrees different from the normal of said meniscus lens.

4. The optical collimating apparatus of claim 1 wherein said CLC comprises a CLC having a tilt making the normal of said CLC more than zero (0) degrees and less than thirty (30) degrees different from the normal of said meniscus lens.

5. An optical collimating apparatus comprising:

a meniscus lens having a reflective concave surface; and a cholesteric liquid crystal (CLC), aligned on an axis common with said meniscus lens, disposed on said concave side of said meniscus lens, positioned to reflect light onto said concave surface and having a tilt making the normal of said CLC more than zero (0) degrees and less than thirty (30) degrees different from the normal of said meniscus lens; and an image source, having a tilt corresponding to said tilt of said CLC.

6. A method for directing a ghost image from a line of sight, said method comprising:

disposing an image source on the convex side of a meniscus lens;

then collimating light from said image source by means of said meniscus lens towards a cholesteric liquid crystal (CLC);

tilting said CLC to direct any light leaking through said CLC from said line of sight and to reflect a portion of said collimated light back to the concave side of said meniscus lens and correspondingly tilting said image source;

then reflecting said portion of light from the concave side of said meniscus lens back to said CLC; and then transmitting said reflected light through said CLC to said line of sight.

7. The method of claim 6 wherein said step of disposing comprises disposing said image source on both the convex and concave sides of said meniscus lens.

8. The method of claim 7 wherein said step of tilting comprises tilting said CLC at an angle greater than zero (0) degrees and less than thirty degrees (30) from a normal of said meniscus lens.

9. The method of claim 6 wherein said step of tilting comprises tilting said CLC at an angle greater than zero (0) degrees and less than thirty degrees (30) from a normal of said meniscus lens.

10. A method for directing a ghost image from a line of sight, said method comprising:

collimating light from an image source by means of a meniscus lens towards a cholesteric liquid crystal (CLC);

tilting said CLC more than zero (0) degrees and less than thirty (30) degrees from the normal of said meniscus lens to direct any light leaking through said CLC from said line of sight and to reflect a portion of said collimated light back to the concave side of said meniscus lens and correspondingly tilting said image source;

then reflecting said portion of light from the concave side of said meniscus lens back to said CLC; and then transmitting said reflected light through said CLC to said line of sight.

* * * * *